INVENTOR.
CARL M. CARLSON
BY
Kane, Dalsimer and Kane
ATTORNEYS

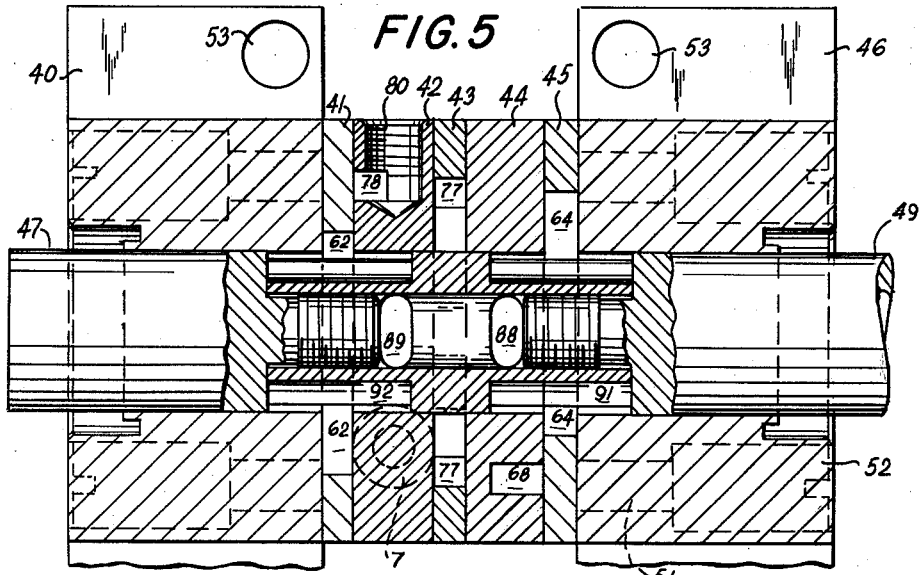
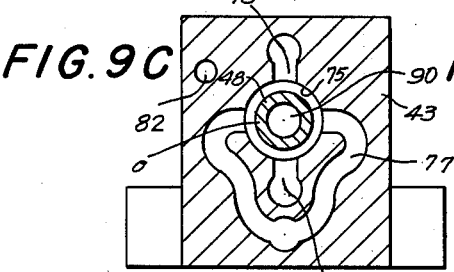
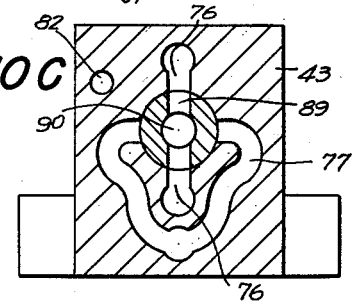
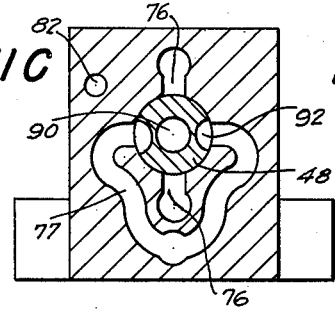
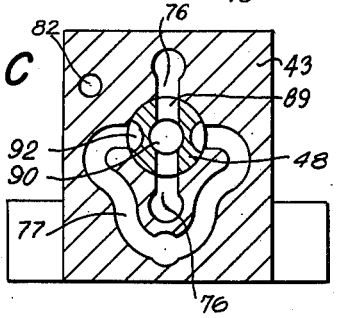
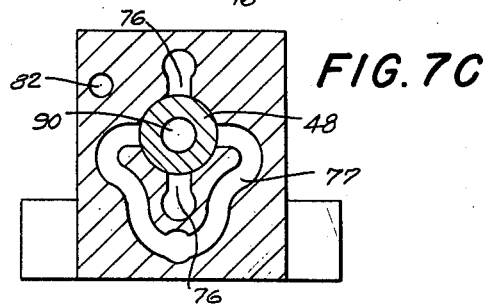
INVENTOR.
CARL M. CARLSON
BY
ATTORNEYS June 15, 1965 C. M. CARLSON 3,189,049
MULTI-CHANNEL VALVE
Filed Aug. 2, 1963 6 Sheets-Sheet 5

INVENTOR.
CARL M. CARLSON
BY
Kane, Dalsimer and Kane
ATTORNEYS

June 15, 1965

C. M. CARLSON 3,189,049

MULTI-CHANNEL VALVE

Filed Aug. 2, 1963

INVENTOR.
CARL M. CARLSON
BY
Kane, Dalsimer and Kane
ATTORNEYS

United States Patent Office 3,189,049
Patented June 15, 1965

1

3,189,049
MULTI-CHANNEL VALVE
Carl M. Carlson, 344 12th St., Cresskill, N.J.
Filed Aug. 2, 1963, Ser. No. 299,648
16 Claims. (Cl. 137—625.24)

This invention relates generally to valves and more particularly to a valve having a plurality of channels through the body and through the plunger which are generally parallel to one another and to the longitudinal axis of the valve as well as radial channels for ingress and egress of the fluid.

Although the invention is described and claimed herein in terms of a four-way valve, the invention can be embodied in valves other than four-way valves and the four-way valve is selected for purposes of description only and the application should not be limited thereto. Parallel advantages of the multi-chanel valve described and claimed herein as opposed to conventional valves can be shown for any model spool or plunger type valve having more than two porting areas or more than one pair of valving elements.

The terms "porting areas" and "valving elements" are used herein as generally understood in that branch of technology which is devoted to fluid power applications. The precise definitions of these terms as used herein will become apparent below.

A four-way valve basically serves to control the reciprocation of a double acting cylinder. When the valve spool or plunger is in one offset position, for example, one end of the cylinder might be pressurized through the valve, at which time the remaining end would be open to the tank or exhaust through the valve. When the spool is in the opposite offset position, the former end would be open to tank and the latter would be pressurized. In short, four pairs of valving elements in the valve are involved to control the pressure urged reciprocation of the piston of a double acting cylinder. Two of the pairs of valving elements communicate, one to pressure, one to tank, with one of the two cylinder porting areas, while the other two pairs communicate, in like manner, one to pressure, one to tank, with the other cylinder porting areas of the valve. These pairs of valving elements, the bore in the body and the lands of the spool form the opening and closing pairs in a spool-type valve, are further integrated, by design, to open and close so that when pressure is on either cylinder port, its communication with the tank is closed, and so that the other cylinder port is open to tank and its communication with pressure is closed.

In the conventional spool type four-way valve, these four pairs of elements are arranged with the two inlet-connecting pairs essentially centrally located between the two cylinder ports and the two tank connecting pairs outboard (axially) of the two cylinder ports. This results in the formation of five porting areas (not to be confused with the valving pairs—there are still only the required four pairs).

Reference to FIG. 1, which is a diagrammatic sketch of a typical spool type, hydraulic, four-way valve shown in right offset position, will aid in the understanding of the terminology to be used herein and will help to illustrate the advantages of the invention.

In FIG. 1 the numeral 20 indicates the spool or plunger of a typical spool type, hydraulic, four-way valve in which longitudinally displaced cylindrical portions 21, 22 and 23 are of the same outside diameter and are of greater diameter than lesser diameter cylindrical portions 24 and 25. Cylindrical portion 24 is between portions 21 and 22 and portion 25 which is substantially equal in outside diameter to portion 24 is between portions 22 and 23. The body or cylinder of the valve is indicated by the numeral 26 with the end seals 27 and central axis 28 which is the longitudinal axis of the spool and body which are concentric. There are five porting areas defined primarily by the internal diameter or configuration of body 26 and these porting areas are indicated by the numerals 29a, 29b, 29c, 29d and 29e, which are separated by lands 30a, 30b, 30c and 30d. The tank ports are indicated by the numerals 31 and 32, the cylinder ports by the numerals 33 and 34, and the inlet or pressure port by the numeral 35. The valving pairs, of which there are four, are indicated by the numerals 36a, 36b, 36c and 36d.

The peripheries of members 21, 22 and 23 are referred to as spool lands, while the peripheries of portions 24 and 25 are referred to as spool necks. The areas 29a, 29b, 29c, 29d and 29e are referred to as body recesses while the portions 30a, 30b, 30c and 30d are referred to as the body bore portions. The letter A indicates the dimensional difference between the diameter of a body recess and the diameter of a body bore. The letter B indicates the longitudinal depth or measurement of a body recess. The letter C indicates the dimension of the longitudinal depth of a body bore portion or the longitudinal distance between adjacent body recesses. The letter D indicates a stroke length and it is assumed that the spool 20 can be reciprocated longitudinally within body 26 by an external source, not shown, to traverse the distance D.

As seen by way of the illustration of FIG. 1, in the conventional spool type valve the five porting areas are arranged, one after the other, along the spool axis. This means that once such dimensions as A, B, C, D and E are fixed by design considerations of flow, strength, etc., the minimum length of the valve is set at 2E+5B+4C. It is also noted that in the conventional valve the two tank portion areas indicated by the numerals 31 and 32 in FIG. 1 are separate and remote from each other. Since normally the discharge fluid must be conveyed back to one tank (sometimes called the sump) the two tank porting areas must be rejoined by additional, not otherwise functional passages in the body, such as illustrated by the dashed lines indicated by the numeral 38 in the sketch, or by passages through the spool that are not otherwise functional and which are illustrated by the dotted lines indicated by the numeral 39 in FIG. 1. The alternative to these two methods of conveying liquid back to the tank is to combine the two tank areas through plumbing, externally, or run two separate lines back to the sump, both of which involve otherwise unnecessary added cost.

Essentially, the multi-channel valve described herein as the invention reduces the required length of valve, all conditions of design being equal, and eliminates the complication of two separate and remote tank porting areas by the device of placing the tank porting areas essentially in the same plane as the inlet porting area and still providing the four pairs of valve elements required for four-way valves, functionally, by utilizing a combination of segmental periphery valving elements and longitudinally, along the spool axis, valving elements in place of the full peripheral pairs of valving elements of the conventional valve.

One of the objects of this invention is to provide a four-way valve which has less of a longitudinal length than a conventional four-way, spool type valve of equal design requirements.

Another object of this invention is to eliminate in a four-way valve the necessity of two remote tank porting areas with the resultant elimination of the necessity to provide a connecting flow channel.

Another object of this invention is to provide a hydraulic valve which has full static pressure balance maintained both axially and radially by the symmetry of shape with respect to the spool axis along any diameter.

Another object of this invention is to provide a four-way valve in which each porting area in the valve body has an element of at least two pairs of functional valving elements.

Still another object of the invention is to provide a hydraulic valve having longitudinal flow which develops velocity forces acting on the spool in either offset direction tending to maintain the spool in offset.

A further object of the invention is to provide a valve in which the effect of variations in pressure in the tank line is minimized.

Another object of the invention is to provide a hydraulic valve in which the spool or plunger is provided with increased bearing surface since in any plane perpendicular to the functional axis and within the functional length of the valve, regardless of spool position within its functional stroke, significant segments of the outer circumference of the spool are in bearing contact with the significant segments of the circumference of the body bore.

Still another object of the invention is to provide a hydraulic valve wherein tandem operation flow is direct from the inlet port area peripherally around the neck of the spool and to the closely adjacent tank porting area.

Another object of the invention is to provide a valve in which the flow cutting action of the spool lands entering the body bores to effect shut-off takes place over a relatively small portion of the bore circumference at any of the required four pairs of valving elements.

And yet another object of the invention is to provide a four-way valve that can operate as a rotary valve as well as a spool valve without any change in structure except as to the actuating device used to move the spool.

A multi-channel valve embodying the invention and the manner of using the same is described herein with references to the drawings, in which:

FIG. 5 is a longitudinal sectional view looking towards the front of the valve;

FIG. 6C is a cross-sectional view taken along the line 6C—6C in the direction of the arrows in FIG. 6B;

FIG. 7C is a cross-sectional view taken along the line 7C—7C in the direction of the arrows in FIG. 7B;

FIG. 9C is a cross-sectional view taken along the line 9C—9C in the direction of the arrows in FIG. 9B;

FIG. 10C is a cross-sectional view taken along the line 10C—10C in the direction of the arrows in FIG. 10B;

FIG. 11C is a cross-sectional view taken along the line 11C—11C in the direction of the arrows in FIG. 11B.

Figure 2:
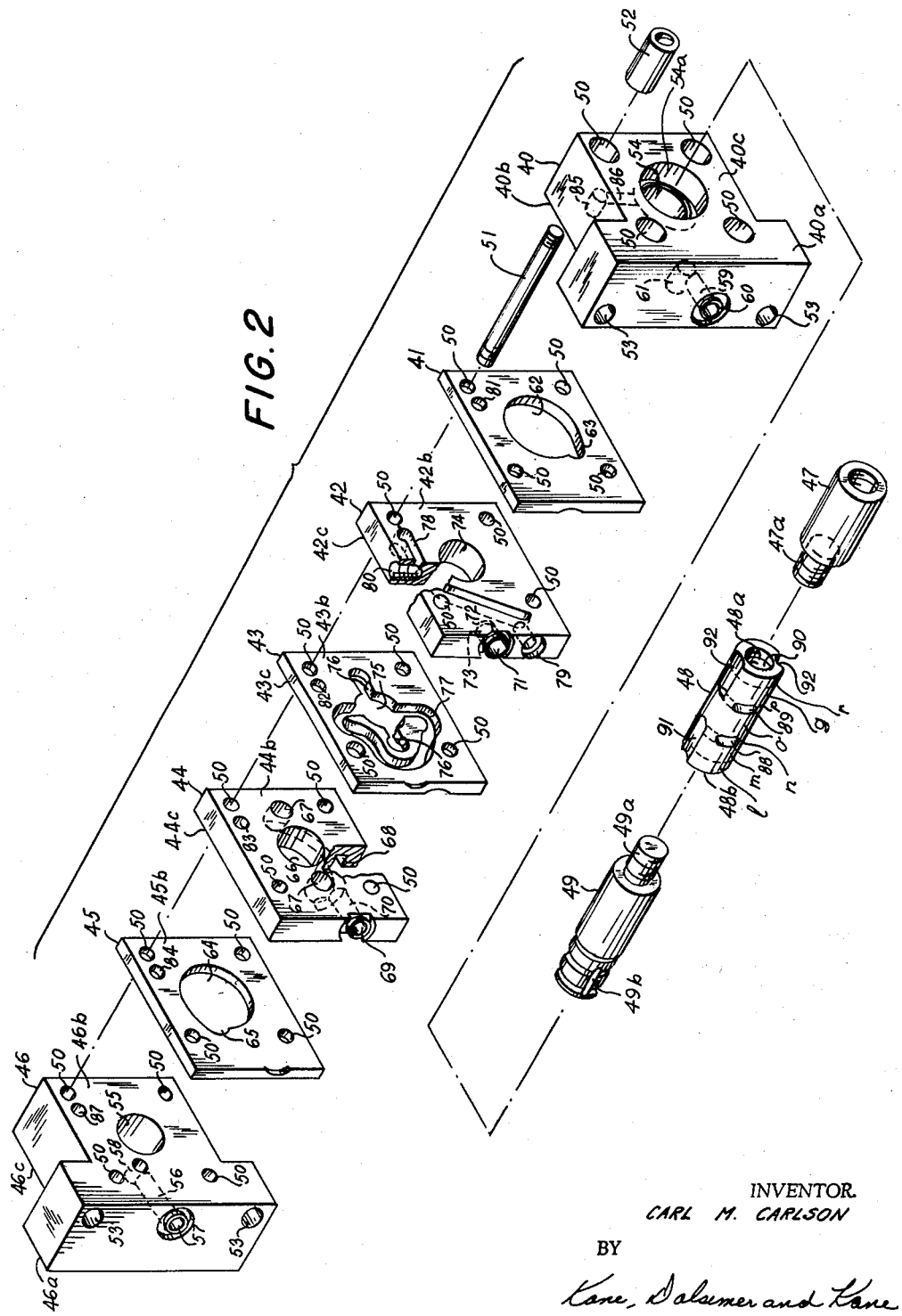
FIG. 2 is an exploded perspective view of the four-way valve embodying the invention with portions cut away to disclose certain details thereof.
Figure 3:
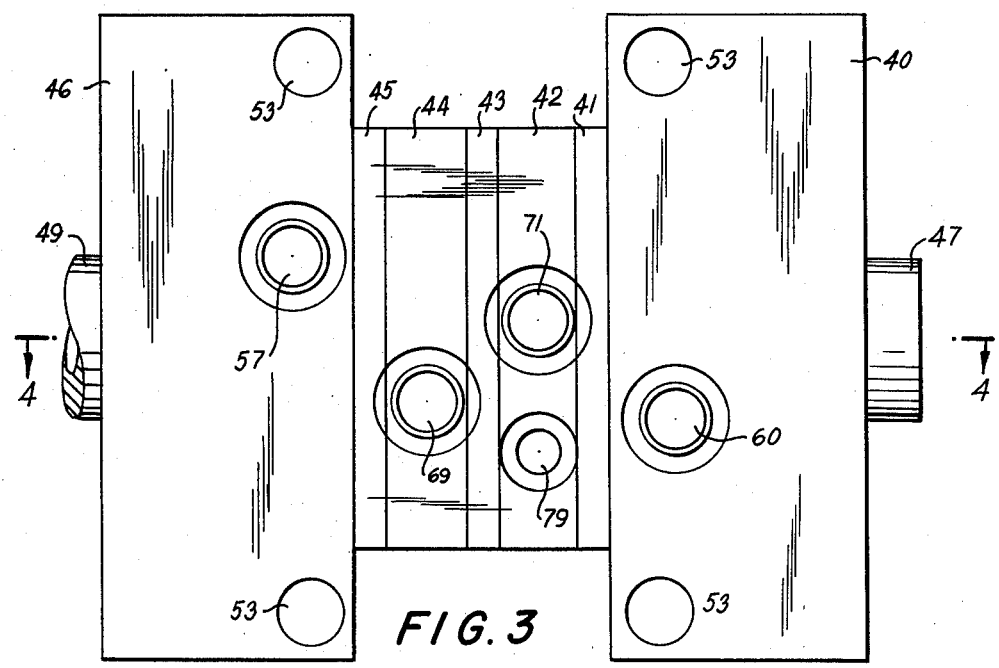
FIG. 3 is a side elevation of the valve shown in FIG. 2 illustrating the ports thereof.

In FIG. 2 a multi-channel valve constructed in accordance with the teachings of this invention is shown in exploded view with the segmental portions of the body indicated by the numerals 40, 41, 42, 43, 44, 45 and 46, and the plunger or spool portions indicated by the numerals 47, 48 and 49.

Figure 4:
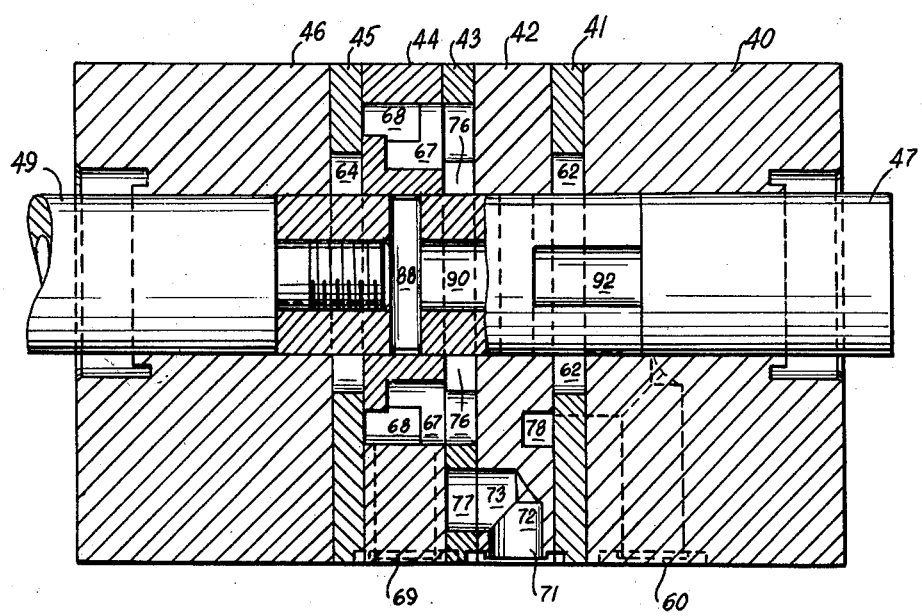
FIG. 4 is a cross-sectional view taken along the line 4—4 in the direction of the arrows shown in FIG. 3.

It is noted that each of the segmental portions of the body is formed of aluminum or other suitable corrosion-resistant material in a wafer-like, substantially square member with at least four through holes indicated by the numeral 50 in FIG. 2 for maintaining the segmental parts together, face-to-face, as seen in FIG. 4 by means of connecting rods 51 and members 52 which are fastened at either end of each connecting rod 51 by means of a threaded periphery of the connecting rod. For the valve shown in FIG. 2, four connecting rods 51 would be used although in exploded view only one is shown and eight capping members 52 would be used although as shown in FIG. 2 only one appears. The base portion 46a of end segment 46 and the base portion 40a of end segment 40 are formed with outwardly projecting flanges providing through holes 53 for mounting the valve to a suitable structure.

Segment 40 is provided with a central through hole 54 as is segment 46 in which the through hole is indicated by the numeral 55.

The diameters of holes 54 and 55 are the same and slightly greater than the outside diameter of members 47 and 49 which can be received therein in a snug sliding fit. A hole 56 is provided in segment 46 terminating at one end in port 57 and at the other end in longitudinal hole 58 which is open to face 46b of segment 46 but not open to the rear face thereof which is not shown in FIG. 2 but which is indicated by the numeral 46c. Segment 40 is provided with hole 59 opening into port 60 and longitudinal hole 61 which, like hole 58, opens to the inner face 40b of member 40 but not to the outer face 40c thereof.

The porting area for port 60 is provided in segment 41 in the form of through hole 62 which is substantially greater in diameter than through hole 54 of segment 40 and through hole 55 of segment 46 which is identical in diameter to through hole 54, and is slightly off center. Porting area 62 is provided with an extension 63 having a radial outer portion substantially of the radius of longitudinal hole 61 and in the assembled condition opened thereto for communication so that in the assembled condition an extension of the longitudinal axis of cylindrical hole 61 pierces the center of radius of the curved portion of extension 63 and the curved portion of extension 63 lies on the circumference of the opening of hole 61 in face 40b.

Segment 45 is substantially identical to segment 41 and provides the porting area for port 57 in the form of a slightly off center through hole 64 equal in diameter to the diameter of through hole 62 and being provided with an extension 65 which has a curved portion having a center lying on an extension of the longitudinal axis of cylindrical hole 58 in segment 46 which opens at face 46b into the extension 65. Segment 44 has a central through hole 66 which has a diameter slightly greater than the outside diameter of member 48 of the spool so that member 48 of the spool can be maintained within through hole 66 and form therewith a sliding sealing fit. The segment 44 is also provided with a pair of longitudinal cylindrical holes 67 having centers offset from the central longitudinal axis of through hole 66 and which are open at face 44b of segment 44. Holes 67 do not open into face 44c of segment 44 but face 44c of segment 44 is provided with a U groove 68 which opens into face 44c of the segment. U groove 68 communicates with one hole 67 at one of its ends and with the remaining hole 67 at the other of its ends. The U groove is also formed so that the portion thereof facing out of face 44c in the assembled condition abuts face 45b of segment 45 and does not communicate with or open into through hole 64 of segment 45. Port 69 is formed in segment 44 and communicates with hole 68 by means of cylindrical hole 70.

Port 71 is formed in segment 42 and connected by cylindrical hole 72 to longitudinal hole 73 which opens into face 42c of segment 42. Segment 42 is also provided with a cylindrical central through hole 74 which has a diameter equal to the diameter of through hole 66 in segment 44 and slightly greater than the outside diameter of member 48 of the spool so that member 48 of the spool can project through opening 74 and be maintained therein in the assembled valve in a snug sliding sealing fit.

Segment 43 is provided with a central through hole 75 which is substantially equal in diameter to hole 74 and which is provided with diametrically opposed radially extending longitudinal keyhole portions 76, which open both on face 43b and 43c of segment 43 and which provide the porting area for port 69. Portions 76 open into through hole 75 and each portion terminates in a circular radial portion, each of which communicates with holes 67 of segment 44. Segment 43 is also provided with a through channel 77 which opens on either end at through hole 75, projects radially therefrom and projects around one of the keyhole portions 76 on a radius greater than the radius of portion 76 and without communicating with either of portions 76, but communicating with longitudinal hole 73 in segment 42.

The description thus far has been of the cylinder or valve body. The various through holes, and grooves described are the functional body bores. Segment 42 is also provided with a through groove 76 which terminates in ports 79 and 80 and which opens at face 42b and face 42c of segment 42 communicating with through holes 81, 82 and 83 of members 41, 43 and 44, respectively. 84 is not a through hole but terminates and communicates in front of the end seal at segment 46 as does 85 (and 86) in segment 40. The cylindrical longitudinal hole thus formed in the assembled valve terminates at one end in longitudinal hole 85 and radial hole 86, communicating with the axial, enlarged end seal counterbore 54a of segment 40 and terminating at the other end in like manner with the end seal counterbore, inboard of the end seal, of segment 46. Port 80 together with the associated bores provided by groove 78 and holes 81, 82, 83 and 84 and 85, 87 and groove 86 is provided for conveying liquid, that may leak by the plunger, back to the tank at low pressure and does not constitute a portion of the functional cylinder bore.

The plunger or spool is composed of three members or parts, 47, 48 and 49, each cylindrical and each having substantially the same outside diameter and longitudinal axis. Member 47 is provided at one end with a decreased diameter portion 47a containing external threads to be received within the threaded bore 48a of member 48 and member 49 is provided with a threaded decreased diameter portion 49a to be received within a threaded bore 48 of member 48 which is not shown. Member 49 is provided with a peripheral longitudinal slot 49b enabling the plunger or spool to be properly positioned and oriented within the central bore provided by openings 54, 62, 74, 75, 66, 64 and 55 of the body portion.

Member 48 is hollow and provided with diametrically opposed radial slots 88, only one of which is seen in FIG. 2, and like longitudinally displaced radial slots 89. Slots 88 and 89 communicate with the central bore of member 48 which is indicated in the figures by the numeral 90 to provide a passage. Member 48 is also provided with two pairs of diametrically opposed grooves in the outer surfaces of the member each of the grooves providing a passage. In the figures one such set of grooves is indicated by the numeral 91 and a second set of such grooves is indicated by the numeral 92. Grooves 91 and 92 are positioned so that one of the pair of grooves 91 lines up with the periphery of one of the pair of grooves 92 as do the remaining grooves of the pair 91 and 92 line up with one another on the periphery of the member 48. The grooves of the pairs 91 and 92 do not communicate with one another nor does a groove of one of the pairs communicate with a groove of the other of the pairs. Also the grooves do not communicate with the bore of member 48.

To aid in the description of the operation of the valve, phantom lines have been applied on the periphery of member 48, further sectioning the member. Thus, the letters $m, n, o, p, q$ and $r$, each indicate a cylindrical section of member 48. It is noted that the longitudinal dimension of $o, m$ or $q$ is equal to the longitudinal dimension of segment 42 or segment 44, while the longitudinal dimension of section $l, n, p,$ or $r$, is equal to the longitudinal dimension of segment 41, segment 43, or segment 45.

As illustrated and described thus far, the cylinder ports of the valve are the ports indicated by the numerals 57 and 60, while the tank port is indicatted by the numeral 69 and the pressure port is indicated by the numeral 71. The respective porting areas for such ports are 64, 62, 76 and 77.

As seen the cylinder port 57 communicates with holes 56, 58 and central or slightly eccentric opening 64 by way of extension 65. Cylinder port 60 communicates through holes 59 and 61 with central or slightly eccentric bore 62 and extension 63. The cylinder porting areas, therefore, of the valve illustrated in FIG. 2 are area 62 of body segment 41 which is the porting area for port 60 and central opening 64 in segment 45 which is the porting area for port 57. The tank port communicates through hole 70, U-channel 68 and holes 67, with keyhole portions 76 of body segment 43. The keyhole portions 76 in body 43 provide as the porting area for the tank port. The pressure port communicates through holes 72 and 73 with hole 77 of body segment 43 and hole 77 of body segment 43 is the porting area for the pressure port 71.

The valve body is assembled by use of members 51 and gaskets or other seal members may be provided between segments if desired.

A description of the operation of the valve will now be considered with reference to FIGS. 6a, 6b, 6c, 7a, 7b, 7c, 8a, and 8b.

Figure 6A:
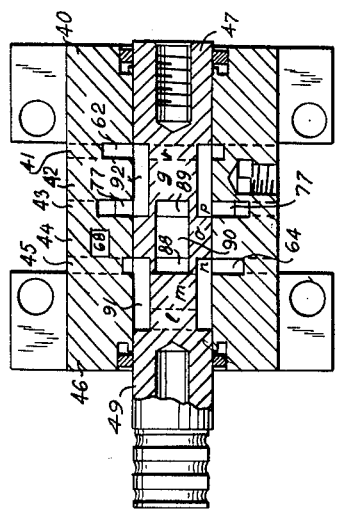
FIG. 6A is a longitudinal cross-sectional view of the valve shown in FIG. 2 with the plunger in the left-hand offset position.
Figure 6B:
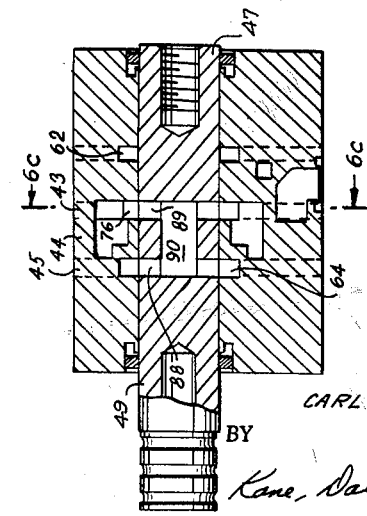
FIG. 6B is a view similar to that in FIG. 6A with the valve rotated 90° about its longitudinal axis.

In FIGS. 6a, 6b and 6c, the left-hand offset position of the plunger is shown and the plunger has been moved longitudinally by an external source which is not shown. It is noted that in the left-hand offset position sections *l* and *m* of the spool are adjacent segment 46 of the body and sections *n, o, p, q* and *r* of the plunger are adjacent segments 45, 44, 43, 42 and 41 of the body, respectively. In this condition port 57 is exhausted to tank and port 60 is communicating with pressure. Port 57 communicates with tank port 69 through holes 56 and 58 in body portion 46 and with porting area 64 by means of extension 65 of member 45. Slot 88 of plunger section *n*, bore 90 of plunger section *o*, slot 89 of plunger section *p*, keyhole portions 76 of body segment 43, holes 67 of segment 44 and U-slot 68 and hole 70 of segment 44. In this condition it is seen (especially in FIG. 6B) that the porting area 64 of cylinder port 57 is in communication with porting area 76 of tank port 69.

In the left-hand offset position, cylinder port 60 communicates with its porting area 62 through holes 59 and 61 in segment 40 and extension 63 of porting area 62 in segment 41 and pressure port 71 is in communication with its porting area 77 through holes 72 and 73. Since the plunger is in the left-hand offset position, section *r* of the plunger is adjacent the porting area in segment 41 and section *p* of the plunger is in communication with the porting area 77 allowing communication between porting area 77 and porting area 62 by means of the passage provided by grooves 92 in the plunger (see FIG. 6A).

In the right-hand offset position of the plunger, section *l* of the plunger is adjacent segment 45 of the body, section *m* of the plunger is adjacent segment 44 of the body, section *n* of the plunger is adjacent segment 43 of the body, section *o* of the plunger is adjacent segment 42 of the body, section *p* of the plunger is adjacent segment 41 of the body and sections *q* and *r* of the plunger are adjacent segment 40 of the body. Cylinder port 57 is pressurized since it is now communicating with the pressure porting area 77 by means of grooves 91 in the plunger (see FIG. 8A). At the same time cylinder port 60 is in communication with tank port 69 since the slots 89 are in the porting area 62 and the slots 88 are in the porting area 76 (see FIG. 8B).

In the center position of the plunger, sections *l, m, n, o, p, q,* and *r* of the plunger are adjacent segments 46, 45, 44, 43, 42, 41 and 40 respectively of the body. In the condition all ports are closed. The porting area 64 of cylinder port 57 cannot communicate with either the pressure or tank porting area since slot 88 of the plunger is adjacent segment 44 blocking communication of port area 64 by means of the hollow body of plunger portion 48 and groove 91 is terminated within segment 44. At the same time, cylinder port 60 cannot communicate with tank or pressure since its porting area 62 is blocked from communication with either the tank or pressure porting area because slots 89 of the plunger are adjacent and blocked by segment 42 and groove 92 is terminated at segment 42.

Figure 8A:
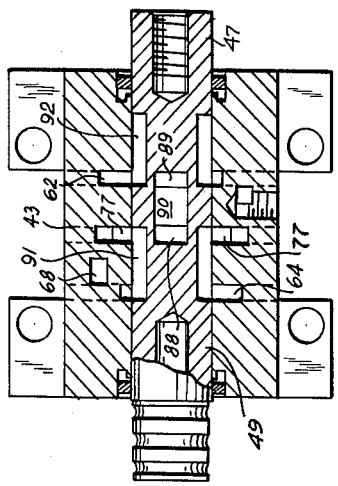
FIG. 8A is a longitudinal cross-sectional view of the valve shown in FIG. 2 with the plunger in the right-hand offset position.
Figure 8B:
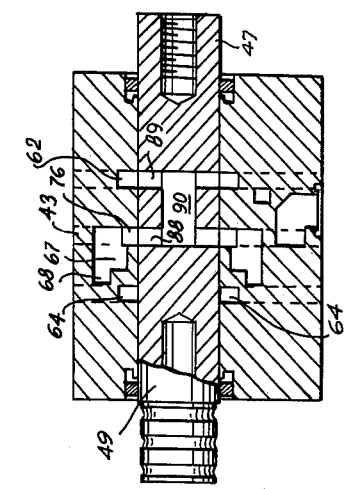
FIG. 8B is a view similar to that in FIG. 8A with the valve rotated 90° about its longitudinal axis.
Figure 7A:
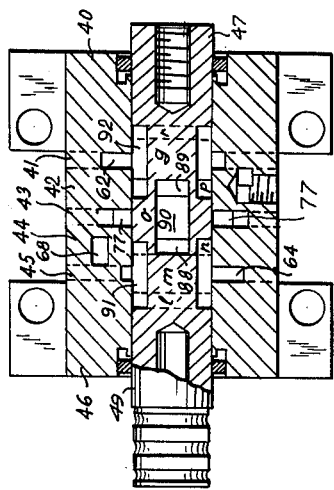
FIG. 7A is a longitudinal cross-sectional view of the valve shown in FIG. 2 with the plunger in the center position.
Figure 7B:
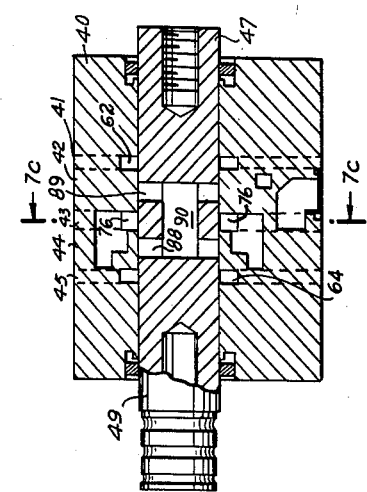
FIG. 7B is a view similar to that in FIG. 7A with the valve rotated 90° about its longitudinal axis.

In the flow diagrams 6a, 6b and 6c it is readily apparent that in the left-hand offset position the porting area 64 of cylinder port 57 is in communication with porting area 76 of tank port 69 through the bore 90 of the plunger as seen in FIG. 6b, and porting area 62 of cylinder port 60 is in communication with porting area 77 of pressure port 71 through grooves 92 of the plunger as seen best in FIG. 6a. FIGS. 7a, 7b and 7c show clearly that there is no communication between porting areas in the center position of the plunger. In the right hand offset position FIG. 8a shows porting area 64 of cylinder port 57 in communication with porting area 77 of pressure port 71 through groove 91 in the plunger and porting area 62 of cylinder port 60 in communication with porting area 76 of tank port 69 through plunger bore 90 is shown in FIG. 8b.

Figure 9A:
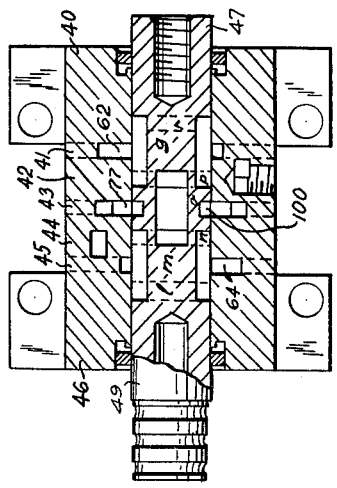
FIG. 9A is a longitudinal cross-sectional view of the valve embodying the invention with an alternate arrangement of components in which the plunger is shown in the center position for tandem operation.
Figure 9B:
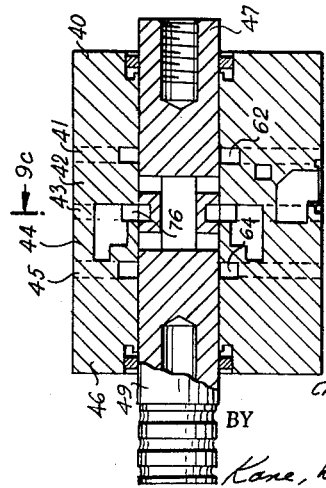
FIG. 9B is a view similar to that in FIG. 9A with the valve rotated 90° about its longitudinal axis.

FIGS. 9a, 9b and 9c illustrate an alternate form of the invention in which the valve body is the same as the valve body previously described and the plunger is identical with the plunger previously described with the exception of a small necked down or decreased diameter portion given the numeral 100 in the FIGS. 9a, 9b and 9c. The necked down portion is in section *o*, but does not occupy the full section so that portions of section *o* having the full periphery or full circumference of the plunger remain. In this configuration, it is noted that in center position the porting area 76 of tank port 69 communicates directly with the porting area 77 of pressure port 71 by means of the necked down portion 100. In the left-hand or right-hand offset position of the plunger, the flow patterns developed are the same with respect to the cylinder ports 57 and 60 as shown in FIGS. 6a and 8a and the corresponding FIGS. 6b and 8b.

Figure 10A:
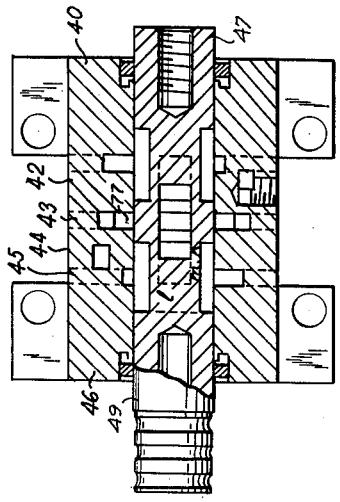
FIG. 10A is a longitudinal cross-sectional view of the valve embodying the invention with an alternate arrangement of components in which the plunger is shown in the center position for cylinder ports open to tank.
Figure 10B:
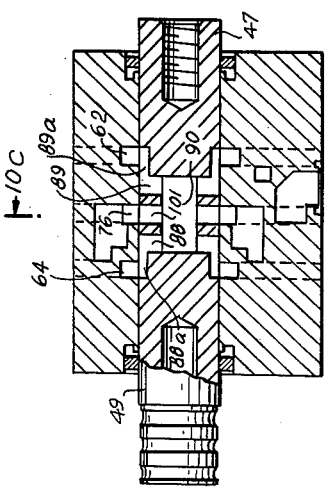
FIG. 10B is a view similar to that in FIG. 10A with the valve rotated 90° about its longitudinal axis.

Still another embodiment of the invention is shown in FIG. 10a wherein the operation of the valve is such that in left-hand or right-hand offset position, flow patterns such as those illustrated by 6a and 8a with respect to the cylinder ports are achieved. In the center position, however, in this embodiment both cylinder ports are open to the tank. The body portion of the valve is identical to the body portions previously described, however, the plunger portion is modified to extend slots 88 and 89 longitudinally outwardly as seen in FIG. 10b so that extended portion 88a of slot 88 communicates with porting area 64 of cylinder port 57 and extended portion 89a of slot 89 communicates with porting area 62 of cylinder port 60, hence porting areas 62 and 64 communicate with bore 90 of the plunger. An additional pair of radial slots 101 are provided in the plunger between slots 88 and 89 to allow communication of bore 90 with tank porting area 76 when the plunger is in the center position. It is noted that in the left-hand offset position, cylinder port 57 is to pressure as cylinder port 60 is to tank as in the previous embodiment.

Figure 11A:
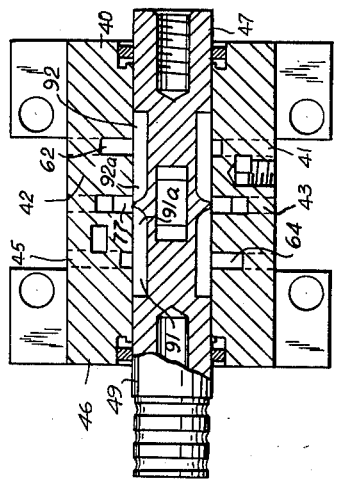
FIG. 11A is a longitudinal cross-sectional view of the valve embodying the invention with an alternate arrangement of components in which the plunger is shown in the center position for cylinder ports open to pressure.
Figure 11B:
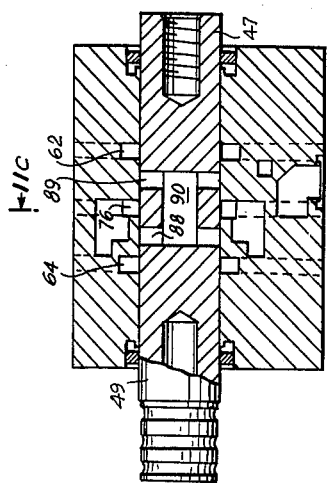
FIG. 11B is a view similar to that in 11A with the valve rotated 90° about its longitudinal axis.

Another embodiment of the invention is shown in FIGS. 11a, 11b and 11c in which the valve body is identical to the valve body previously described but in which grooves 91 and 92 are extended longitudinally inwardly so that extension 91a of groove 91 and extension 92a of groove 92 communicate with porting area 77 of the pressure port 71 allowing communication of cylinder port 60 through porting area 62 and cylinder port 57 through porting area 64 with the porting area 77 so that the cylinder ports are open to pressure porting area 77 in the center position of the plunger. In the embodiment shown in FIGS. 11a, 11b and 11c the flow patterns for the left-hand and right-hand offset positions with respect to cylinder ports 57 and 60 are the same as the patterns for the previous embodiments.

Figure 1:
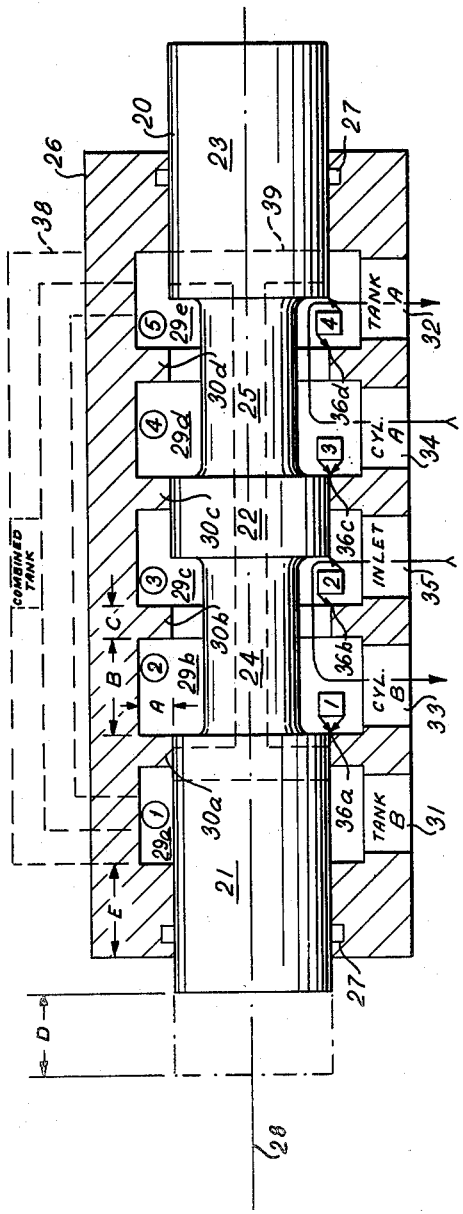
FIG. 1 is a diagrammatic sketch of the typical spool type, hydraulic, four-way valve shown in right offset.

It is seen, therefore, that the valve which has been constructed in accordance with this invention and described herein is reduced in length in comparison with the valve shown in FIG. 1 by a length of 2B plus 2C. The valve shown in FIG. 1 has a length fixed at 2E plus 3B plus 2C.

The valve disclosed herein has each porting area in the body with an element of at least two pairs of functional valving elements, whereas, in the conventional valve such as that shown in FIG. 1, only the inlet porting area and two cylinder porting areas have an element of two pairs and the two tank porting areas have each only an element of one pair. Hence, there are five porting areas of the conventional valve as opposed to four porting areas of the new valve.

In the new valve the need to reunite the two tank porting areas for simplest piping into a circuit is eliminated since both tank pairs of porting elements are in the same porting area.

In the present invention the longitudinal flow results in velocity forces that act on the spool in either offset position, in the same direction parallel to the axis of the spool, so that the dynamics of flow impart a self detenting action (tend to maintain the spool at offset).

The flow, parallel to the spool, both from inlet to cylinder and from other cylinder to tank are in the same direction and to the right when the spool is in right offset position and to the left when spool is in left offset. At normal (rated) flow these dynamic forces will be very small, but regardless of magnitude, they will always assist in keeping the spool in its offset position. In the conventional valve these two flows are in opposite directions and if the one in the direction that urges the spool away from its offset position, as may be the case in a number of more complex circuits, becomes greater, the spool could undesirably self cycle from the offset.

Since the end seals of the new valve are always immediately adjacent to pressurized areas (cylinder porting areas) the condition of pressure at the end seals is relatively unaffected by variations in pressure in the tank line (back pressure). In the conventional valve, this is not the case since the end seals are adjacent to the tank porting areas.

In contrast to a conventional valve, wherein the spool is formed to provide shut off and flow positions (depending on the axial placement of the spool) with lands for shut off (usually the O.D. of the spool) and necked down diameters for flow, the new valve retains segments of the O.D. along the full functional length of the spool (except for the relatively short necked down portion of the "tandem" spool to provide direct peripheral flow from pressure to tank), thus giving the spool relatively much greater bearing support along the bore of the body. The flow portions of the spool in the new valve are formed so that only a segment of the outside diameter of the spool is removed in any plane. In this embodiment of the valve, one method of providing "flow" portions on the spool is two pair of diametrically opposed grooves, and the other method is with two pair of diametrically opposed (slightly elongated) holes which communicate with the hollow spool center. The first providing flow from inlet to cylinder and the other providing flow from cylinder to tank. In tandem type valves of the new design only the spool is further formed with a short necked down portion, but it should be noted that even in this case, at no point does the functional movement of the spool result in a full periphery of a spool land entering a full periphery of a body bore since, at the inlet and tank segment of the body, where the necked down portion of the tandem type spool operates, a large percentage of the body bore is retained (the bore here is only interrupted by the body inlet and tank passages). This means that, in any plane perpendicular to the functional axis and within the functional length of the valve, regardless of spool position within its functional stroke, significant segments of the spool outer circumference and in "bearing" contact with significant segments of the circumference of the body bore.

Because the tandem (or open center) type valve (one that permits flow directly from pump to tank in the center position) is frequently desired in hydraulic circuitry, the new valve offers great advantage in that the "tandem" flow is direct from the inlet porting area, peripherally around the neck of the spool, and to the closely adjacent (in the same plane) tank porting area. This as opposed to a conventional valve where, to get the "tandem" pattern, it is necesary to provide conveyance of the fluid from the inlet porting area to relatively remote (separated from inlet by at least one cylinder area) tank porting area.

A common cause of valve failure is also minimized in the new valve in that the flow "cutting" action of the spool lands entering the body bores (to effect shut off) takes place over a relatively small portion of the bore circumference at any of the required four pairs of valving elements. In the conventional valve, this action takes place around the full periphery of each of the four pairs of valving elements. The advantage of the new valve thus becomes apparent when consideration is given to dirt or solid foreign particles that may (and frequently are) be present in the fluid. Particles which are larger than the clearance between lands of the spool and the bore of the body can only enter and get jammed (preventing or retarding further movement of the spool) at these points of fluid "cutting" action, and, since these are relatively much shorter in the new valve, the chances for such jamming are less. Further, such foreign matter cannot affect the continuous valving action of the "longitudinal" valving portions.

It should also be noted that contrary to the conventional valve, the spool in the valve disclosed herein must be constrained from rotating, so that the grooves and holes will communicate as intended. The groove 49b in the end of the spool is provided for this purpose.

It should also be noted that this embodiment can be made to work like a Four-Way valve by rotating the spool a quarter turn in either of its offset positions (without any axial spool movement whatsoever). That is it can operate as a rotary valve as well as a spool valve without any change in structure except as to the actuating device used to move the spool.

Thus, among others, the several objects in the invention as specifically aforenoted, are achieved. Obviously, numerous changes in construction and rearrangement of parts might be resorted to without departing from the spirit of the invention as defined by the claims.

I claim:

1. A valve including a body, a longitudinal bore provided in said body, a movable member within said bore, a first radially extending portion of said bore providing a first porting area, a second radially extended portion of said bore providing a second porting area, first and second ports, first and second hole means formed in said body and communicating said first and second porting areas with said first and second ports respectively, said first port being longitudinally spaced from said first porting area, a transverse segment of said body, a through hole in said segment forming part of said longitudinal bore, said first and second porting areas being longitudinally disposed on either side of said segment, a section of said movable member within said through hole in one position thereof, longitudinal passage means formed in said movable member having a longitudinal dimension greater than the longitudinal dimension of said segment whereby said longitudinally displaced porting areas are in communication when said section is so disposed.

2. A valve in accordance with claim 1 in which said movable member is movable longitudinally within said bore for displacement from said one position whereby said longitudinal passage is removed from providing communication between said porting areas.

3. A valve in accordance with claim 1 in which said movable member is movable rotationally within said bore for displacement from said one position whereby said longitudinal passage is removed from providing communication between said porting areas.

4. A valve in accordance with claim 1 in which a third radially extended portion of said bore is provided forming a third porting area, a third port is provided, third hole means are formed in said body communicating said third porting area with said third port, a second transverse segment is provided, said first and third porting areas being longitudinally disposed on either side of said second transverse segment, second passage means are provided in said movable member isolated from said first passage means and having a longitudinal dimension greater than the longitudinal dimension of said second transverse segment, and a second position of said movable member whereby in said second position said first and third porting areas are in communication through said second passage means.

5. A valve in accordance with claim 4 in which said movable member is movable longitudinally within said bore for displacement from said one position to said second position whereby said first passage means are removed from providing communication between said first and second porting areas and said second passage means are positioned to provide communication between said first and third porting areas.

6. A valve in accordance with claim 4 in which said movable member is movable rotationally within said bore from said one position to said second position whereby said first passage means are removed from providing communication between said first and second porting areas; and said second passage means are positioned to provide communication between said first and third porting areas.

7. A valve including a body, a longitudinal bore provided in said body, a longitudinally movable member within said bore, a first cylinder porting area formed by a first radially extended portion of said bore, a second cylinder porting area formed by a second radially extended portion of said bore, a tank porting area formed by a third radially extended portion of said bore, a pressure porting area formed by a fourth radially extended portion of said bore, said tank and pressure porting areas disposed between said first and second cylinder porting areas, a first cylinder port, a second cylinder port, tank and pressure ports, first cylinder hole means formed in said body and second cylinder hole means, tank and pressure hole means communicating said first cylinder, second cylinder, tank and pressure porting areas with said first cylinder, second cylinder, tank and pressure ports respectively, and either of said tank and pressure ports being longitudinally spaced from its respective porting area, a transverse segment between said tank and pressure porting areas and first cylinder porting area, a second transverse segment between said tank and pressure porting areas and said second cylinder porting area, first and second through holes in said first and second transverse segments respectively forming portions of said longitudinal bore, said movable member including a section, said section being wholly within said first through hole when said movable member is in a first position and wholly within said second through hole when said movable member is longitudinally displaced to a second position, first passage means formed in said movable member having a longitudinal dimension greater than each of said first and second transverse segments, second passage means formed in said movable member having a longitudinal dimension greater than said first transverse segment, third passage means formed in said movable member having a longitudinal dimension greater than said second transverse segment and said first passage means between said second and third passage means whereby in said first position said first cylinder porting area is in communication with said tank porting area through said first passage means and said second cylinder porting area is in communication with said pressure porting area through said third passage means and in said second position said second cylinder porting area is in communication with said tank porting area through said first passage means and said first cylinder porting area is in communication with said pressure porting area through said second passage means.

8. A valve in accordance with claim 7 in which the tank and pressure porting areas are in the same plane and have angularly spaced openings into said bore and said first passage means is angularly spaced an equal amount from said second and third passage means.

9. A valve in accordance with claim 8 in which said second and third passage means includes first and second grooves respectively in the surface of said movable member, and said first passage means includes a bore formed in said movable member exposed to the surface at either end by first and second slots.

10. A valve in accordance with claim 9 in which the inner ends of said first and second grooves lie in the same plane as said first and second slots respectively and in the first position of said movable member said first slot communicates with said first cylinder porting area, said second slot communicates with said tank porting area and the inner end of said second groove communicates with the opening of said pressure porting area in said bore and said second cylinder porting area also communicates with said second groove.

11. In a valve having a body with a central longitudinal bore and a movable member within said bore; a pressure porting area of said body in communication with said bore; a tank porting area of said body communicating with said bore at a location angularly displaced from the location of communication of said pressure porting area with said bore; a first passage in said movable member having an end exposed to the surface of said movable member; a second passage in said movable member having an end exposed to the surface of said movable member in the plane of the exposed end of said first passage and angularly displaced therefrom the same amount as the displacement of the locations of communication of said tank and pressure porting areas with said bore; a cylinder porting area in communication with said bore a second end of said first passage exposed to the surface of said movable member; a second end of said second passage exposed to the surface of said movable member; a first position of said movable member wherein the first end of said second passage is in communication with said pressure porting area and said second end thereof is in communication with said cylinder porting area; and a second position of said movable member wherein the second end of said first passage is in communication with said tank porting area and the first end therof is in communication with said cylinder porting area.

12. A valve in accordance with claim 11 in which the movable member is movable longitudinally from said first to said second position.

13. A valve in accordance with claim 11 in which the communication of the tank and pressure porting areas with the bore are in the same plane.

14. A valve in accordance with claim 13 in which the movable member is movable rotationally from said first to said second position.

15. A valve including a body, a central bore of said body, longitudinally displaced first and second porting areas formed by enlarged portions of said central bore, first and second ports communicating with said first and second porting areas respectively, a radial channel formed in said body communicating with said bore at a location between said first and second porting areas, a second radial channel formed in said body communicating with said bore at a location in the same transverse plane of communication of said first radial channel with said bore and angularly displaced therefrom, a plunger, a plunger bore, first and second spaced holes formed in said plunger exposing said plunger bore to the surface of said plunger, first and second longitudinal grooves formed in the surface of said plunger, said grooves being on either side of said first and second holes and angularly displaced therefrom the same amount as the angular displacement of the location of communication of said first and second radial channels with said bore and the inner-ends of said first and second grooves lying in the plane of said first and second holes respectively, a first position of said plunger wherein said first porting area is in communication with said first radial channel thorugh said first and second holes and said plunger bore while said second porting area is in communication with said second radial channel through said second groove, a second position of said plunger wherein said first porting area is in communication with said second radial channel through said first groove and said second porting area is in communication with said first radial channel through said first and second holes and said plunger bore.

16. A valve in accordance with claim 15 in which third and fourth ports are provided and third and fourth port communicating means are provided communicating said third and fourth ports with said first and second radial channels respectively.

References Cited by the Examiner

UNITED STATES PATENTS 1,519,670   12/24   Daustrup _____ 137—625.43 XR
3,020,927   2/62   McLaughlin _____ 251—367 XR
3,029,830   4/62   Klover et al. _____ 251—367 XR M. CARY NELSON, *Primary Examiner.*
MARTIN P. SCHWADRON, *Examiner.*